United States Patent
Yamada

(10) Patent No.: US 11,904,506 B2
(45) Date of Patent: Feb. 20, 2024

(54) CONNECTOR AND METHOD FOR MANUFACTURING SAME

(71) Applicant: SUMITOMO WIRING SYSTEMS, LTD., Mie (JP)

(72) Inventor: Hiroki Yamada, Mie (JP)

(73) Assignee: SUMITOMO WIRING SYSTEMS, LTD., Mie (JP)

( * ) Notice: Subject to any disclaimer, the term of this patent is extended or adjusted under 35 U.S.C. 154(b) by 815 days.

(21) Appl. No.: 16/975,287

(22) PCT Filed: Feb. 27, 2019

(86) PCT No.: PCT/JP2019/007530
§ 371 (c)(1),
(2) Date: Aug. 24, 2020

(87) PCT Pub. No.: WO2019/172037
PCT Pub. Date: Sep. 12, 2019

(65) Prior Publication Data
US 2020/0391413 A1 Dec. 17, 2020

(30) Foreign Application Priority Data
Mar. 7, 2018 (JP) .................. 2018-041111

(51) Int. Cl.
*B29C 33/14* (2006.01)
*B29C 45/14* (2006.01)
(Continued)

(52) U.S. Cl.
CPC .............. *B29C 33/14* (2013.01); *B29C 45/14* (2013.01); *B29C 45/27* (2013.01); *H01R 13/50* (2013.01); *H01R 43/24* (2013.01)

(58) Field of Classification Search
CPC ..... B29C 33/14; B29C 45/0046; B29C 45/14; B29C 45/14639; B29C 45/27;
(Continued)

(56) References Cited

U.S. PATENT DOCUMENTS 5,825,085 A 10/1998 Masumoto et al.
11,303,061 B2 * 4/2022 Yamada ................. H01R 31/06

FOREIGN PATENT DOCUMENTS

| JP | 2006-009853 A | 1/2006 |
| JP | 2011-245848 A | 12/2011 |
| JP | 2017-105150 A | 6/2017 |

OTHER PUBLICATIONS

International Search Report dated May 21, 2019 for WO 2019/172037 A1 (3 pages).

* cited by examiner

*Primary Examiner* — Yunju Kim
(74) *Attorney, Agent, or Firm* — Venjuris, P.C.

(57) ABSTRACT

A connector (1) is provided with a plurality of connector terminals (3), core resin portions (2A, 2B), through nuts (4) and an outer resin portion (5). An opening (402) of a screw hole (40) located in an inner end surface (42) of the through nut (4) is closed by a nut facing surface (21A) of the core resin portion (2A). The outer resin portion (5) covers the core resin portions (2A), (2B) and the through nuts (4) with exposed surfaces (25) of the core resin portions (2A, 2B) and outer end surfaces (41) of the through nuts (4) exposed. Injection marks (51) at the time of molding the outer resin portion (5) are formed on a surface of a part of the outer resin portion (5) covering an opposite side surface (22B) of the core resin portion (2B).

7 Claims, 14 Drawing Sheets

(51) Int. Cl.
*B29C 45/27* (2006.01)
*H01R 13/50* (2006.01)
*H01R 43/24* (2006.01)

(58) Field of Classification Search
CPC .......... B29C 2045/0027; H01R 13/405; H01R 13/50; H01R 13/504; H01R 43/24
See application file for complete search history.

CONNECTOR AND METHOD FOR MANUFACTURING SAME

CROSS REFERENCE TO RELATED APPLICATIONS

This application is a national phase of PCT application No. PCT/JP2019/007530, filed on 27 Feb. 2019, which claims priority from Japanese patent application No. 2018-041111, filed on 7 Mar. 2018, all of which are incorporated herein by reference.

TECHNICAL FIELD

The present invention relates to a connector including a plurality of connector terminals and a method for manufacturing the same.

BACKGROUND

In various machine components, a connector provided with a plurality of connector terminals is used in wiring an electronic control component and a control device. In the connector, the plurality of connector terminals may be arranged in a connector case made of resin by insert molding. Further, in the connector, a nut for mounting the connector on various mounting components may be arranged in the connector case by insert molding.

For example, in an insert-molded article and a method for manufacturing the same of Patent Document 1, a through nut and a lid member are covered by resin with a first opening of the through nut closed by the lid member and a second opening of the through nut exposed to outside. In performing insert molding, an inner peripheral side of the second opening of the through nut is fit to a positioning protrusion provided in a lower mold and an outer inner peripheral side of the second opening of the through nut is fit to an outer peripheral rib provided in the lower mold. In this way, the through nut is positioned with respect to the lower mold.

Further, in a method for manufacturing an insert-molded article of Patent Document 2, when insert molding of resin is performed using a cap nut with a non-penetrating screw hole, a stopper to be threadably engaged with the screw hole of the nut is provided in a lower mold. In performing insert molding, the nut is fixed to the lower mold by the stopper.

PRIOR ART DOCUMENT

Patent Document

Patent Document 1: JP 2017-105150A
Patent Document 2: JP 2005-288763A

SUMMARY OF THE INVENTION

Problems to be Solved

However, in Patent Document 1, the following problem occurs when molten resin is injected into a cavity formed by the upper and lower molds in forming an insert-molded article. Specifically, the through nut is supported only by the lower mold. Thus, when the molten resin injected into the cavity from a gate of the upper mold collides with the lid member, the postures of the lid member and the through nut may be inclined with respect to the lower mold.

Further, in Patent Document 2, the stopper serving as a movable portion rotatable with respect to the lower mold needs to be provided in the lower mold to fix the nut to the lower mold. Thus, the structure of the lower mold for insert molding becomes complicated.

Further, in Patent Document 1, since the lid member needs to be covered with the resin, the lid member cannot be supported by the upper mold. Further, also in Patent Document 2, since the nut needs to be covered with the resin, the nut cannot be supported by the upper mold. Thus, further ingenuity is necessary to form a connector including a nut whose position and posture are accurately maintained by a mold having a simple structure.

The present invention was developed in view of such a problem and aims to provide a connector which can be molded by a mold having a simple structure such that the penetration of an outer resin portion into a screw hole of a through nut is prevented and the position and posture of the through nut are accurately maintained, and a method for manufacturing the same.

Means to Solve the Problem

One aspect of the present invention is directed to a connector with a plurality of connector terminals, a core resin portion for covering intermediate parts of the plurality of connector terminals excluding both end parts, one or more through nuts each including a penetrating screw hole and having an inner end surface facing a nut facing surface of the core resin portion, an opening of the screw hole located in the inner end surface being closed by the nut facing surface, and an outer resin portion for covering the core resin portion and the through nut with a part of the core resin portion and an outer end surface of the through nut exposed, an injection mark at the time of molding the outer resin portion being formed on a surface of a part of the outer resin portion covering an opposite side surface of the core resin portion located on a side opposite to the nut facing surface.

Another aspect of the present invention is directed to a method for manufacturing a connector by insert molding by arranging a core resin portion having a plurality of connector terminals arranged therein and one or more through nuts facing the core resin portion and each including a penetrating screw hole in a mold and injecting a resin material for an outer resin portion for covering the core resin portion and the through nut into the mold, the method including causing a nut facing surface of the core resin portion and an inner end surface of the through nut to face each other in the mold and causing the mold and an outer end surface of the through nut to face each other, and causing a gate of the mold for the resin material to face an opposite side surface of the core resin portion located on a side opposite to the nut facing surface facing the inner end surface of the through nut and closing an opening of the screw hole located in the inner end surface by the nut facing surface of the core resin portion receiving a pressure during injection of the resin material when the resin material is injected toward the opposite side surface from the gate.

Effect of the Invention

The connector of the one aspect is molded, utilizing the core resin portion having the plurality of connector terminals arranged therein as an insert component in insert-molding the outer resin portion.

The core resin portion can be molded by arranging the plurality of connector terminals in a mold and injecting a resin material for the core resin portion into the mold. Further, the connector can be molded by arranging the core resin portion having the plurality of connector terminals arranged therein and the through nut in a mold and injecting a resin material for the outer resin portion into the mold. In molding this connector, the core resin portion can be utilized to hold the through nut in a specified posture.

In the connector, the one or more through nuts are arranged on the nut facing surface of the core resin portion and a part of the core resin portion and the outer end surface of the through nut are exposed to outside. Further, the injection mark at the time of molding the outer resin portion is formed on the surface of the part of the outer resin portion covering the opposite side surface of the core resin portion.

The part of the core resin portion exposed on the surface of the outer resin portion is a part utilized to hold the core resin portion in the mold in molding the outer resin portion in the mold. Further, the outer end surface of the through nut is utilized to hold the through nut in the mold in molding the outer resin portion in the mold. The through nut is so supported as not to change the posture thereof also by the core resin portion held in the mold.

Further, the opening of the screw hole of the through nut located in the inner end surface is closed by the nut facing surface of the core resin portion. The outer resin portion hardly penetrates into the screw hole through a clearance between the inner end surface and the nut facing surface.

Further, the injection mark of the outer resin portion is a part formed by injecting the resin material for molding the outer resin portion into the mold from the gate provided in the mold. In molding the outer resin portion in the mold, the core resin portion and the through nut are arranged in the mold. At this time, to enable the core resin portion and the through nut to be arranged in the mold, the core resin portion and the through nut are not completely sandwiched by the mold. That is, a tiny clearance is formed between the core resin portion and the through nut. The posture of the through nut may be changed by the resin material flowing in the mold.

By injecting the resin material for the outer resin portion toward the opposite side surface of the core resin portion from the gate, the through nut can be pressed against the mold via the core resin portion. The formation of clearances between the nut facing surface of the core resin portion and the inner end surface of the through nut and between the mold and the outer end surface of the through nut are prevented, utilizing a pressure during the injection of the resin material. In this way, in the connector manufactured by molding the outer resin portion, the penetration of the outer resin portion into the screw hole is prevented and the through nut is held in a targeted specified posture.

Further, in molding the outer resin portion, the through nut is positioned by a shape changing portion such as a projection formed in the mold. This shape changing portion for positioning the through nut needs not be a movable portion capable of movements such as rotational and sliding movements with respect to the mold and is formed by changing the shape of the mold. In this way, the complication of the structure of the mold is prevented.

Therefore, the connector of the one aspect can be molded by the mold having a simple structure, the penetration of the outer resin portion into the screw hole of the through nut can be prevented and the position and posture of the through nut can be accurately maintained.

The method for manufacturing the connector of the other aspect is a method suitable for manufacturing the connector of the one aspect. According to this connector manufacturing method, the connector can be molded by the mold having a simple structure such that the penetration of the outer resin portion into the screw hole of the through nut is prevented and the position and posture of the through nut are accurately maintained.

DETAILED DESCRIPTION TO EXECUTE THE INVENTION

Figure 1:
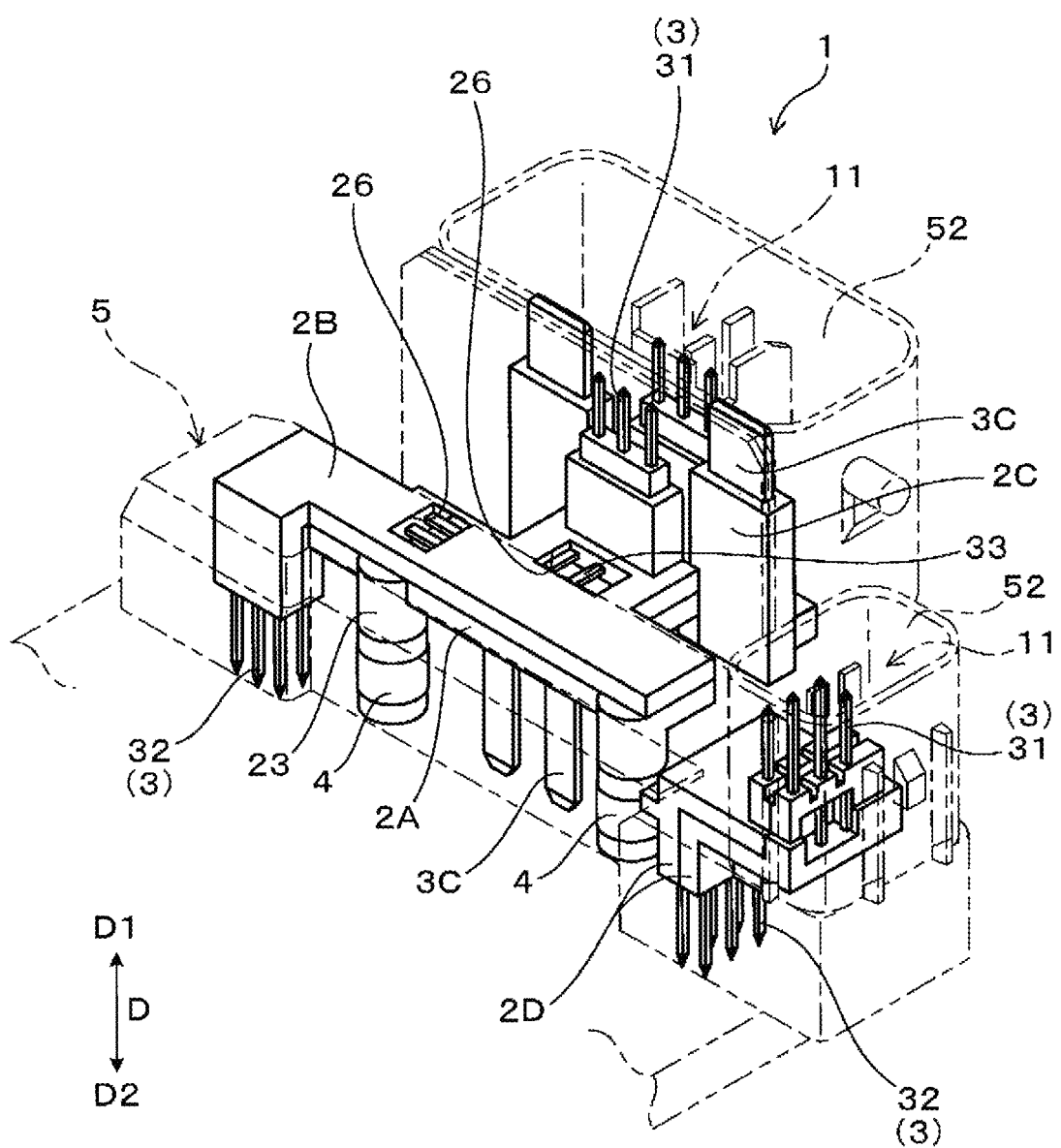
FIG. 1 is a perspective view showing connector terminals, core resin portions, through nuts and the like arranged in an outer resin portion in a connector according to a first embodiment.

Preferred embodiments of the aforementioned connector and method for manufacturing the same are described with reference to the drawings.

First Embodiment

A connector 1 of this embodiment includes, as shown in FIGS. 1 to 5, a plurality of connector terminals 3, core resin portions 2A, 2B, through nuts 4 and an outer resin portion 5. The connector terminals 3 are constituted by conductive conductors. The core resin portions 2A, 2B are formed such that both end parts 31, 32 of the plurality of connector terminals 3 project therefrom and intermediate parts 33 of the plurality of connector terminals 3 excluding the both end parts 31, 32 are covered.

Figure 4:
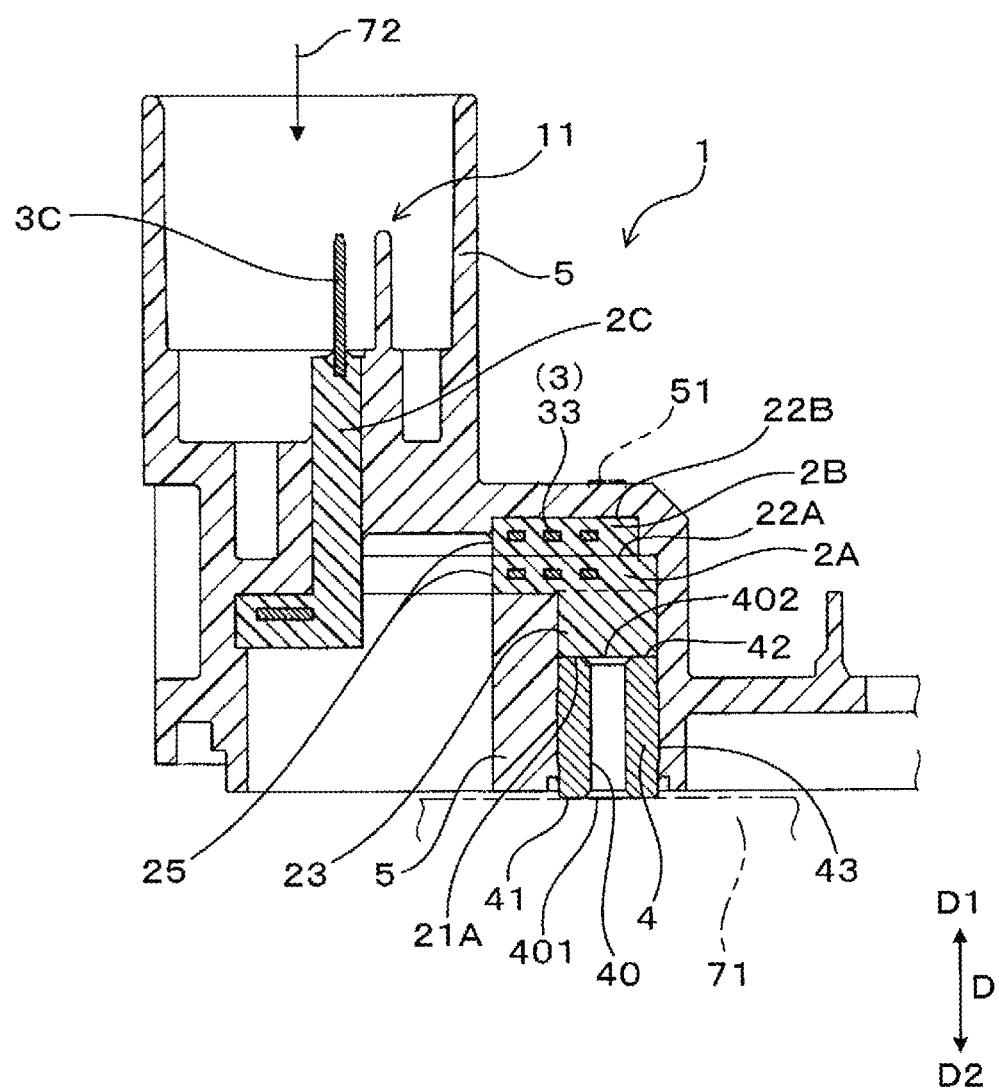
FIG. 4 is a section along IV-IV in FIG. 3 showing the connector according to the first embodiment.
Figure 5:
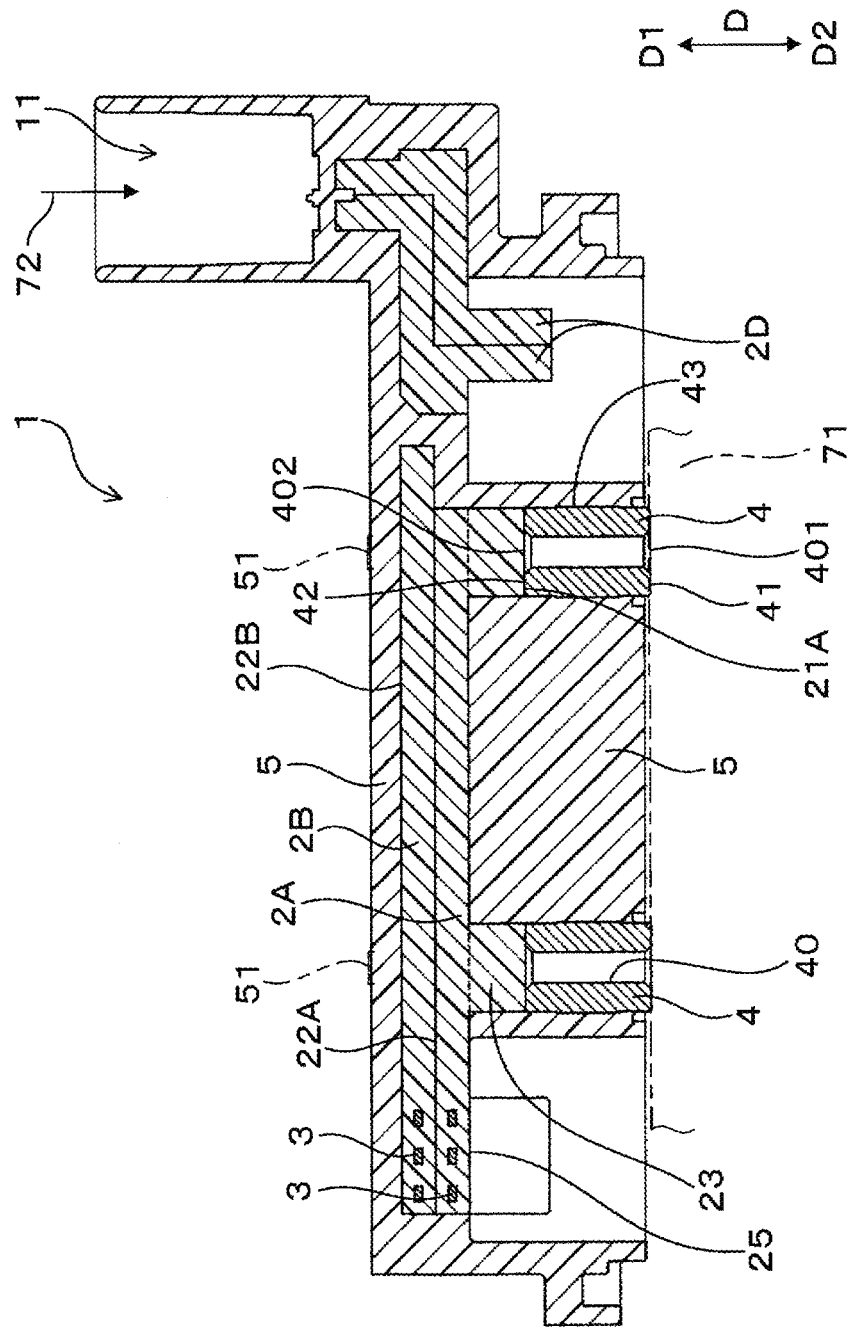
FIG. 5 is a section along V-V in FIG. 3 showing the connector according to the first embodiment.

As shown in FIGS. 1, 4 and 5, the through nut 4 includes a penetrating screw hole 40, and a plurality of (two in this embodiment) through nuts 4 are arranged to face nut facing surfaces 21A of the core resin portion 2A. An inner end surface 42 of the through nut 4 is facing the nut facing surface 21A of the core resin portion 2A, and an opening 402 of the screw hole 40 located in the inner end surface 42 is closed by the nut facing surface 21A. The outer resin portion 5 covers the core resin portions 2A, 2B and the through nuts 4 with exposed surfaces 25 serving as parts of the core resin portions 2A, 2B and outer end surfaces 41 of the through nuts 4 exposed. Injection marks 51 at the time of molding the outer resin portion 5 are formed on a surface of a part of the outer resin portion 5 covering an opposite side surface 22B of the core resin portions 2A, 2B located on a side opposite to the nut facing surfaces 21A.

The connector 1 and a method for manufacturing the same of this embodiment are described in detail below.

The connector 1 of this embodiment is used in electric wiring in an electric power steering of an automotive vehicle. The connector 1 is used as a wiring connecting portion for wiring electronic control devices such as a motor and various sensors used in the electric power steering to a control device. As shown in FIGS. 4 and 5, the connector 1 is mounted on a control board 71 of the control device using the plurality of built-in through nuts 4. Screw portions of bolts arranged on the control board 71 are threadably engaged with the screw holes 40 of the through nuts 4 in the connector 1.

Note that the connector 1 may be mounted on a cover or the like for covering the control device by bolts threadably engaged with the plurality of through nuts 4. In this case, waterproof sealing members can be arranged around the through nuts 4 in the outer resin portion 5.

Although not shown, the connector 1 of this embodiment is formed with a mounting portion to be mounted on a case of the electric power steering. This mounting portion is formed by the outer resin portion 5 and formed into an annular shape to be arranged around an end part of the motor of the electric power steering. Other nuts for mounting the mounting portion on the case of the electric power steering are embedded in the mounting portion. Note that the connector 1 can be used for various machine components other than the electric power steering.

A connector case of the connector 1 of this embodiment is formed by the core resin portions 2A, 2B and the outer resin portion 5. The connector case is formed by insert-molding the outer resin portion 5 using the core resin portions 2A, 2B. A resin material constituting the core resin portions 2A, 2B and a resin material constituting the outer resin portion 5 are thermoplastic resins of the same type. Note that the type of the resin material constituting the core resin portions 2A, 2B and that of the resin material constituting the outer resin portion 5 may be different from each other.

As shown in FIGS. 1 to 5, in the connector 1, a side to be mounted on the control board 71 is referred to as a back side D2 and a side opposite to the back side D2 is referred to as a front side D1. A direction defined by the front side D1 and the back side D2 is referred to as a mounting direction D. On the front side D1 of the connector 1, one end parts 31 of the plurality of connector terminals 3 are arranged and connecting portions 11 to be connected to female connectors 72 are formed by the one end parts 31 of the plurality of connector terminals 3. In the connector 1 of this embodiment, two connecting portions 11 are formed. In the connecting portion 11, a case portion 52 surrounding the one end parts of the plurality of connector terminals 3 is formed by the outer resin portion 5.

(Core Resin Portions 2A, 2B, Connector Terminals 3)

As shown in FIGS. 1 and 5, in the connector 1, other core resin portions 2D having no through nut 4 arranged to face thereto are also arranged besides the core resin portions 2A, 2B having the through nuts 4 arranged to face thereto. The respective core resin portions 2A, 2B and 2D are insert-molded with the plurality of connector terminals 3 arranged before the outer resin portion 5 of the connector 1 is molded. The respective core resin portions 2A, 2B and 2D are used to fix a state of arrangement of the connector terminals 3. By using the core resin portions 2A, 2B and 2D, the connector 1 in which the plurality of connector terminals 3 are arranged can be easily manufactured.

As shown in FIG. 1, the plurality of connector terminals 3 are formed as such male terminals that the both end parts 31, 32 project from the core resin portions 2A, 2B. As shown in FIGS. 4 and 5, the one end parts 31 of the plurality of connector terminals 3 are used for connection to the female connectors 72, and the other end parts 32 of the plurality of connector terminals 3 are mounted on the control board 71. The plurality of connector terminals 3 are arranged at appropriate intervals and in parallel to each other in the core resin portions 2A, 2B.

As shown in FIGS. 4 and 5, a predetermined number of connector terminals 3 are arranged in two stages in the respective core resin portions 2A, 2B of this embodiment. The core resin portions 2A, 2B are separately molded as a first core resin portion 2A and a second core resin portion 2B in two stages to facilitate the molding of the connector 1 in which the connector terminals 3 are arranged in two stages. The first core resin portion 2A includes the nut facing surfaces 21A facing the through nuts 4. The second core resin portion 2B is arranged to face the first core resin portion 2A on the front side D1 in the mounting direction D. Note that the other core resin portions 2D are also molded in two separate stages, similarly to the core resin portions 2A, 2B.

Figure 3:
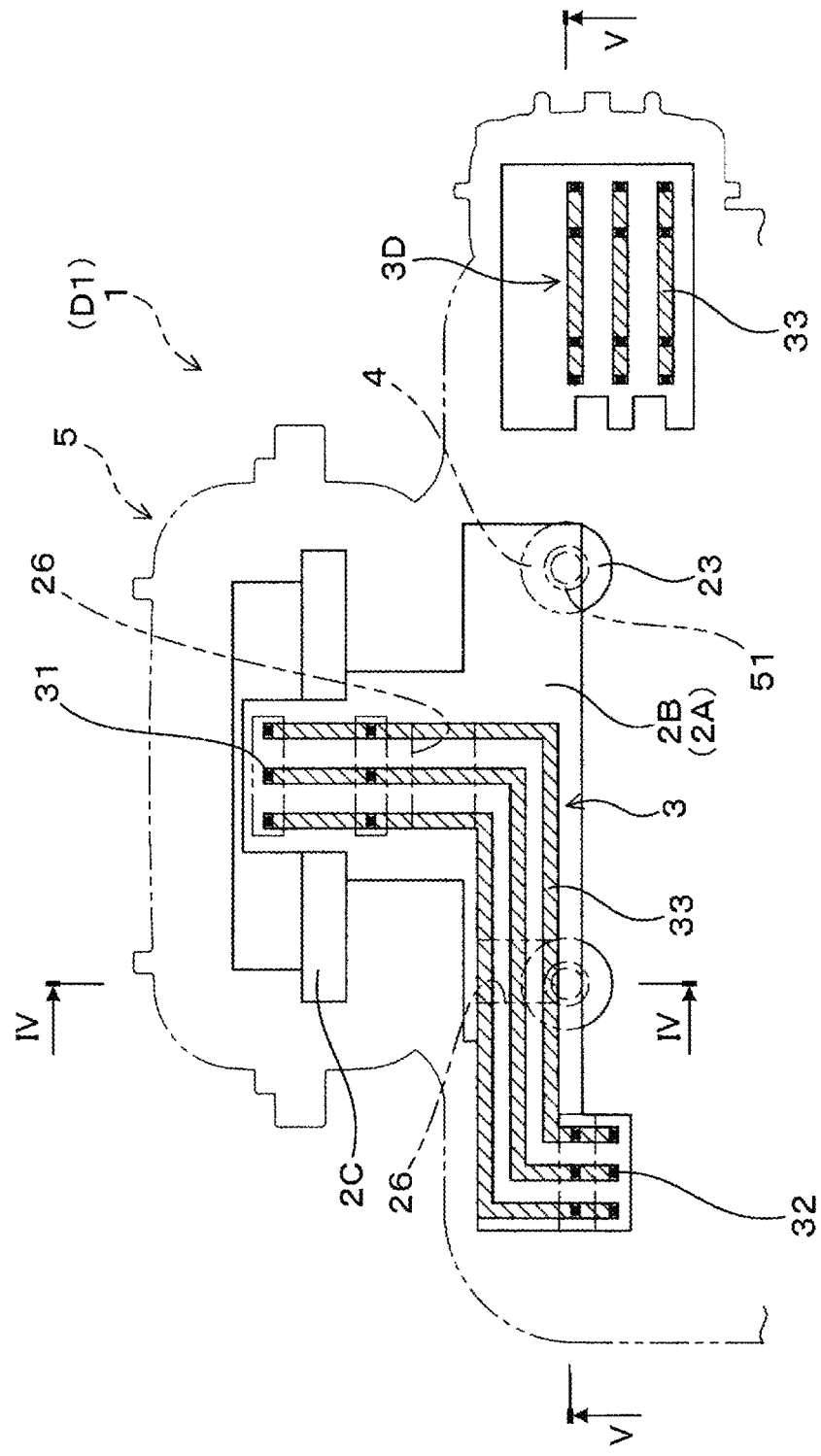
FIG. 3 is a diagram showing a state where the connector terminals are arranged in the core resin portions of the connector according to the first embodiment.

The both end parts 31, 32 of the plurality of connector terminals 3 projecting from the respective core resin portions 2A, 2B and 2D are arranged in parallel to the mounting direction D. As shown in FIG. 3, the intermediate parts 33 of the plurality of connector terminals 3 embedded in the core resin portions 2A, 2B and 2D are bent from a state parallel to the mounting direction D to a state orthogonal to the mounting direction D.

As shown in FIG. 1, the first and second core resin portions 2A, 2B cover most parts of the intermediate parts 33 of the plurality of connector terminals 3. Parts of the intermediate parts 33 of the plurality of connector terminals 3 in the second core resin portion 2B are exposed from the second core resin portion 2B through a hole portion 26 and embedded in the outer resin portion 5. As shown in FIGS. 4 and 5, a part of the first core resin portion 2A covering the intermediate parts 33 of the plurality of connector terminals 3 is formed with facing protrusions 23 facing the through nuts 4.

The nut facing surfaces 21A of the first core resin portion 2A of this embodiment are formed on the tips of the facing protrusions 23. Further, an opposite side surface 22A of the first core resin portion 2A is formed in parallel to the nut facing surfaces 21A. The part of the first core resin portion 2A covering the intermediate parts 33 of the plurality of connector terminals 3 and the part of the second core resin portion 2B covering the intermediate parts 33 of the plurality of connector terminals 3 are arranged in parallel to each other. The opposite side surface 22B of the second core resin portion 2B is formed in parallel to the nut facing surfaces 21A of the first core resin portion 2A.

The nut facing surfaces 21A and the opposite side surfaces 22A, 22B need not necessarily be parallel. The nut facing surfaces 21A and the opposite side surfaces 22A, 22B may be surfaces present in projection ranges of outer shapes when the outer shapes of the inner end surfaces 42 of the through nuts 4 are projected on the first and second core resin portions 2A, 2B along the mounting direction D of the connector 1.

As shown in FIGS. 1 and 4, the plurality of connector terminals 3 are used as control terminals of the electronic control devices such as the motor and the sensors. In the connector 1, power supply terminals (busbars) 3C having a larger cross-sectional area than the connector terminals 3 are also arranged. The power supply terminals 3C are arranged in a power supply core resin portion 2C. Both end parts of the power supply terminals 3C project from the power supply core resin portion 2C, and intermediate parts of the power supply terminals 3C are embedded in the power supply core resin portion 2C. A part of the power supply core resin portion 2C covering the intermediate parts of the power supply terminals 3C is arranged to face the back side D2 of the first core resin portion 2A in the mounting direction D.

(Through Nuts 4)

As shown in FIGS. 4 and 5, the through nut 4 is formed such that the screw hole 40 penetrates in an axial direction. The screw hole 40 forms openings 401, 402 in both the outer end surface 41 and the inner end surface 42 of the through nut 4 in the axial direction. The inner end surface 42 of the through nut 4 faces the nut facing surface 21A of the first core resin portion 2A and the opening 402 of the screw hole 40 in the inner end surface 42 is closed by the nut facing surface 21A.

The through nut 4 is arranged in the connector 1 with the opening 401 of the screw hole 40 in the outer end surface 41 exposed on the back side D2 in the mounting direction D of the connector 1. The through nut 4 is made of a metal material to enhance the strength thereof. The nut facing surfaces 21A of the first core resin portion 2A of this embodiment are surfaces arranged on the back side D2 of the first core resin portion 2A in the mounting direction D of the connector 1.

A plating layer made of a metal material to enhance anticorrosion performance, antirust performance and the like is formed on the entire surface of the through nut 4, i.e. the screw hole 40, the both end surfaces 41, 42 and an outer peripheral surface 43. In forming the plating layer on the through nut 4, the plating layer can be formed as uniformly as possible on the entire surface of the through nut 4 since the screw hole 40 is penetrating. In this way, a force for fastening a bolt into the screw hole 40 can be made as uniform as possible, particularly by making a thickness of the plating layer in the screw hole 40 as even as possible.

On the other hand, in the case of forming a plating layer on a cap nut with a non-penetrating screw hole, a liquid plating material for forming the plating layer is easily pooled in the screw hole and a thickness of the plating layer may become uneven. In this case, a force for fastening a bolt into the non-penetrating screw hole may vary.

Further, the outer end surface 41 of the through nut 4 and a part of the outer peripheral surface 43 thereof adjacent to the outer end surface 41 project from the surface of the outer resin portion 5. In this way, the outer end surface 41 of the through nut 4 can be easily caused to face a mounting surface of the control board 71 or the like of the control device.

(Outer Resin Portion 5)

Figure 2:
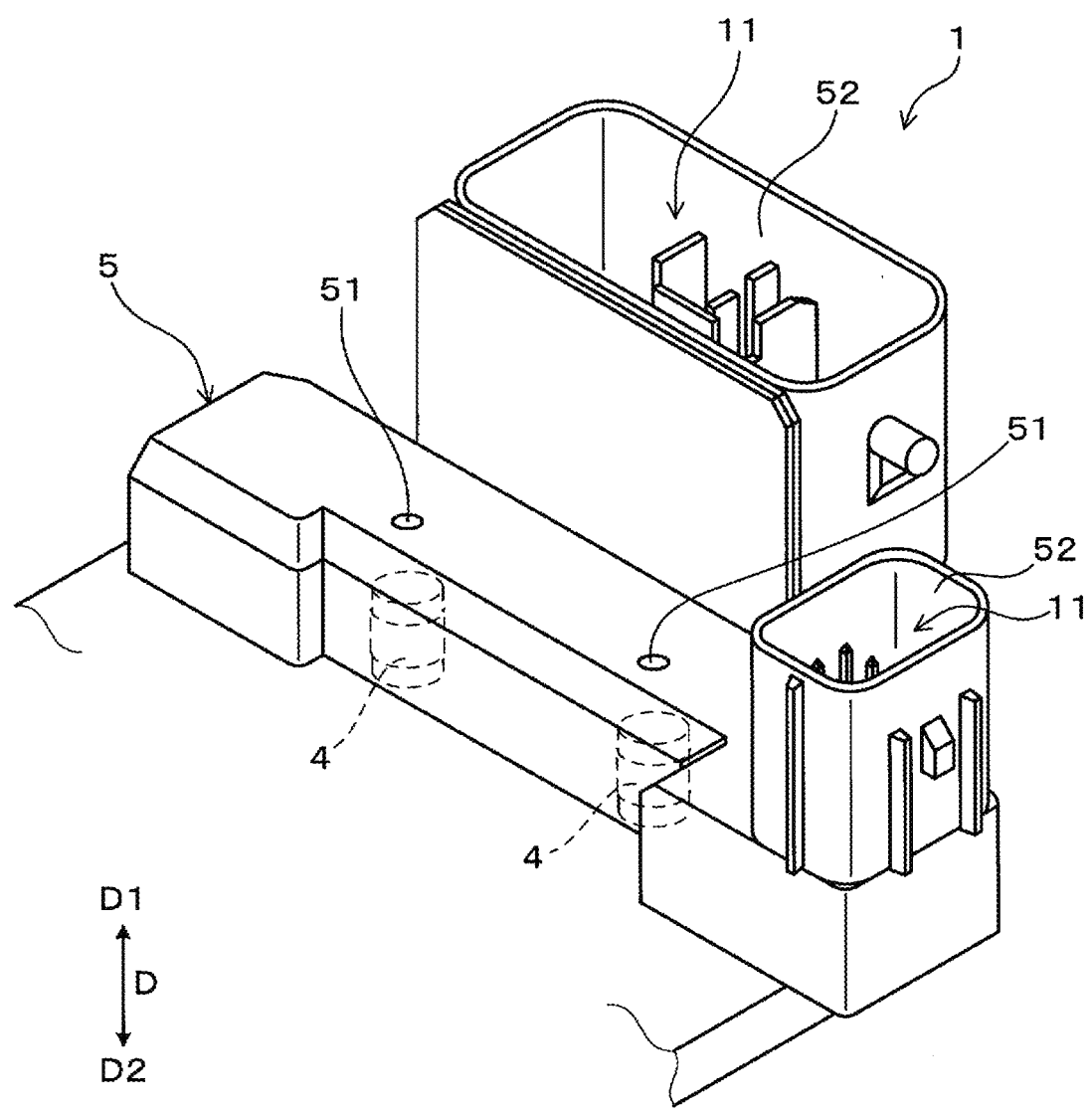
FIG. 2 is a perspective view showing the connector according to the first embodiment.

As shown in FIGS. 1 and 2, the outer resin portion 5 is a resin part forming parts of the connector case other than the core resin portions 2A, 2B and forming the outer shape of the connector case. In the connector 1, the core resin portions 2A, 2B and the outer resin portion 5 are integrated and it is difficult to distinguish the core resin portions 2A, 2B and the outer resin portion 5 from the outside of the connector 1.

However, when the connector 1 is cut, boundary positions between the core resin portions 2A, 2B and the outer resin portion 5 can be confirmed. Surface layers of the resin when the core resin portions 2A, 2B are molded are arranged at these boundary positions. These surface layers have properties different from those of the other parts such as a high hardness in many cases. It can be confirmed also by this that the core resin portions 2A, 2B are formed in the connector case.

(Mold 6)

Next, a mold 6 used in the method for manufacturing the connector 1 is described.

Figure 6:
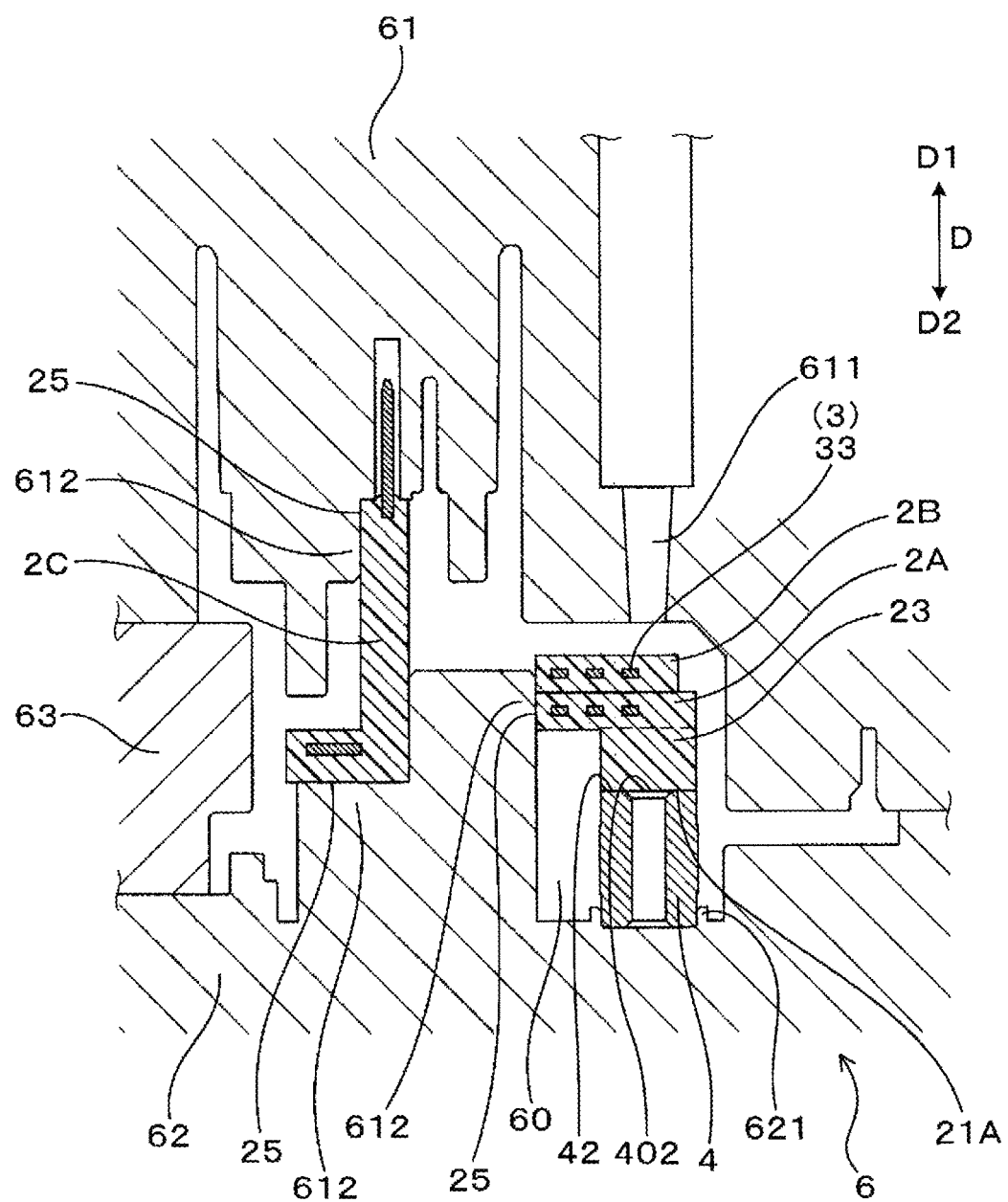
FIG. 6 is a view corresponding to a cross-section along IV-IV in FIG. 3 showing a state where the core resin portions including the connector terminals and the through nuts are arranged in a mold according to the first embodiment.
Figure 7:
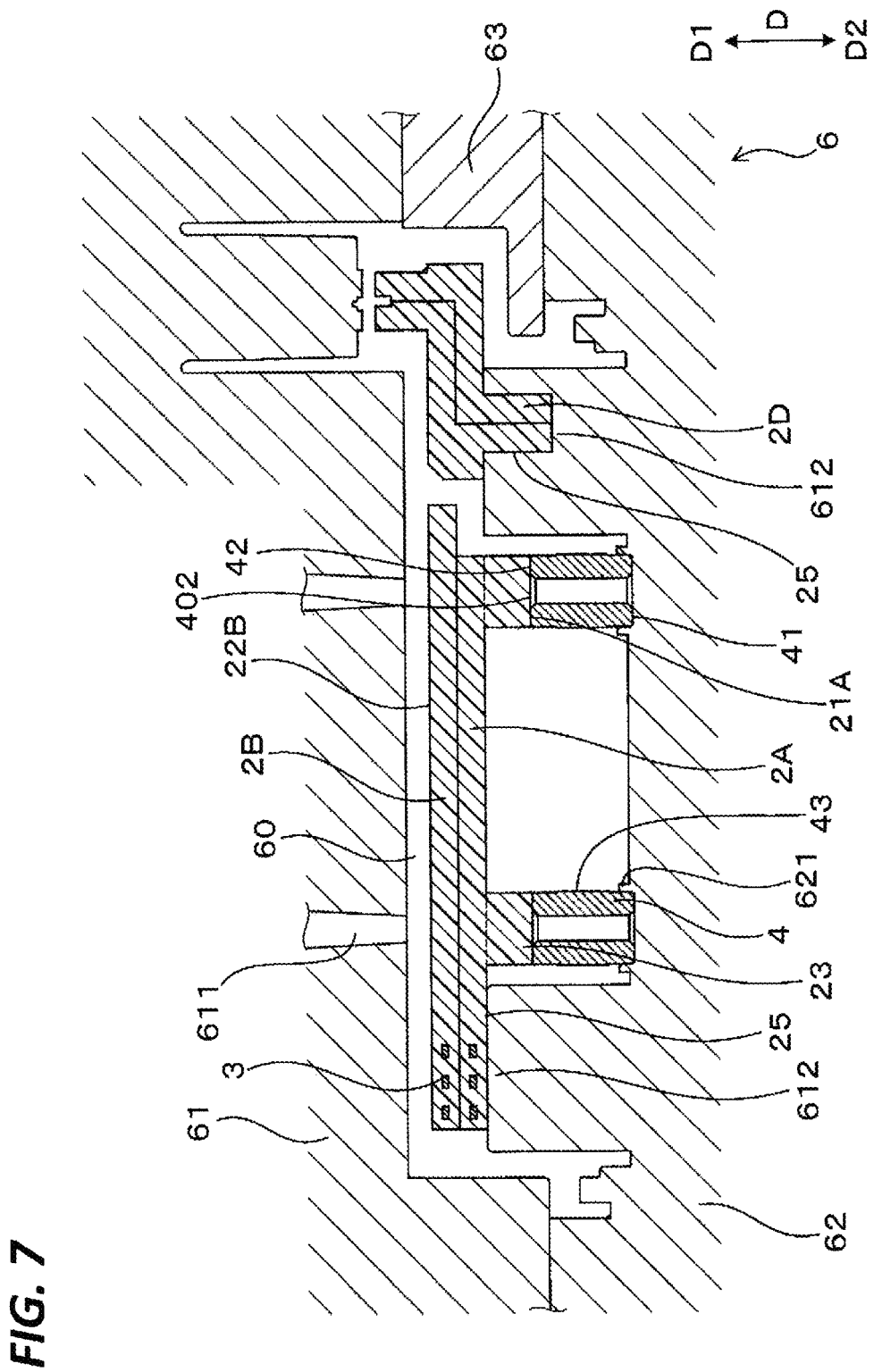
FIG. 7 is a view corresponding to a cross-section along V-V in FIG. 3 showing the state where the core resin portions including the connector terminals and the through nuts are arranged in the mold according to the first embodiment.

The outer resin portion 5 of the connector 1 is molded by injection molding. In injection molding, an injection molding machine with injection cylinders for injecting molten resin and the like and the mold 6 to which the molten resin injected from the injection cylinders is supplied as shown in FIGS. 6 and 7 are used. The molten resin is obtained by melting the resin material for the outer resin portion 5. The mold 6 is divided into a pair of mold parts 61, 62 and a slide mold part 63 to enable a molded article to be taken out after molding.

Figure 8:
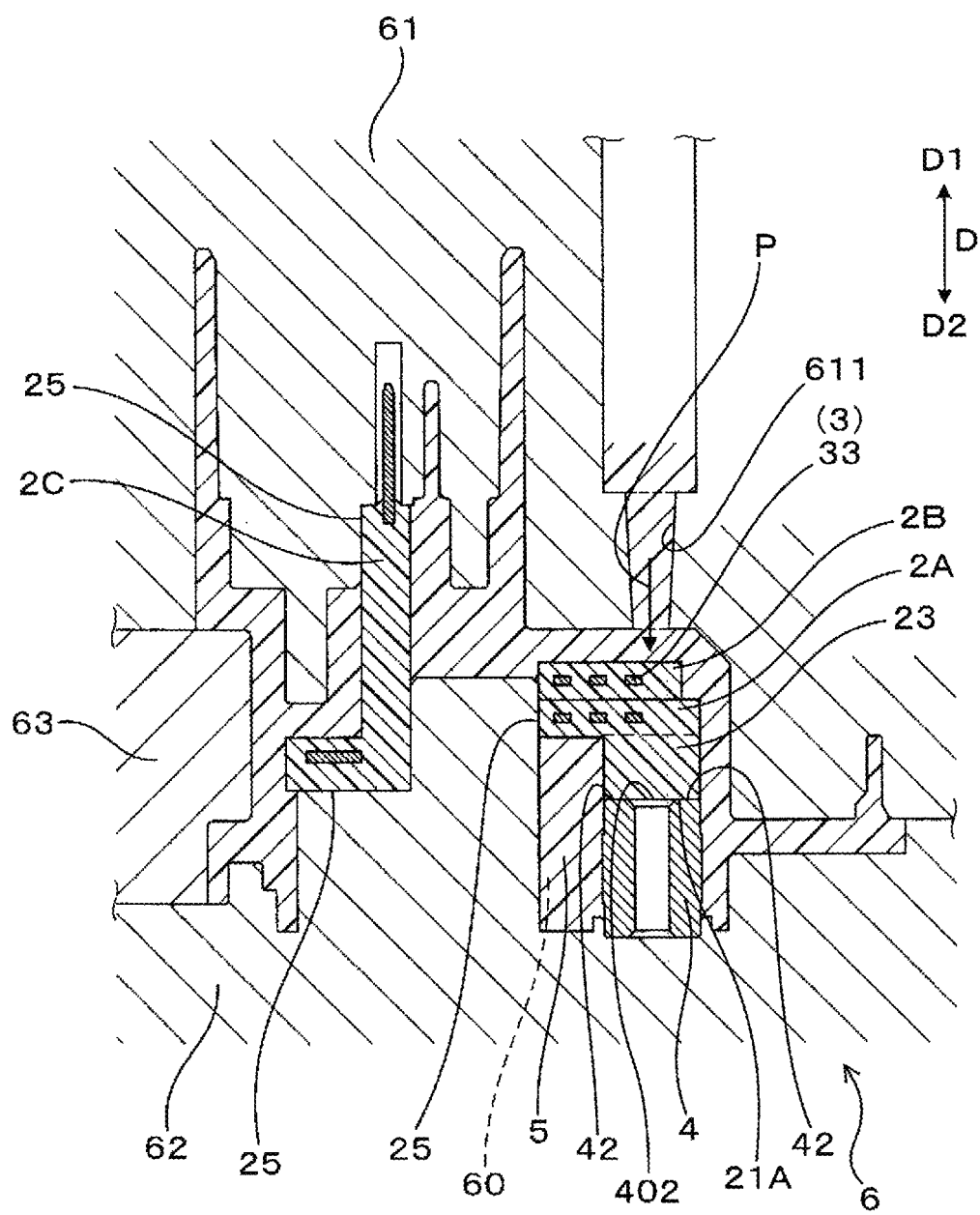
FIG. 8 is a view corresponding to the cross-section along IV-IV in FIG. 3 showing a state where a resin material for the outer resin portion is filled into a cavity of the mold according to the first embodiment.
Figure 9:
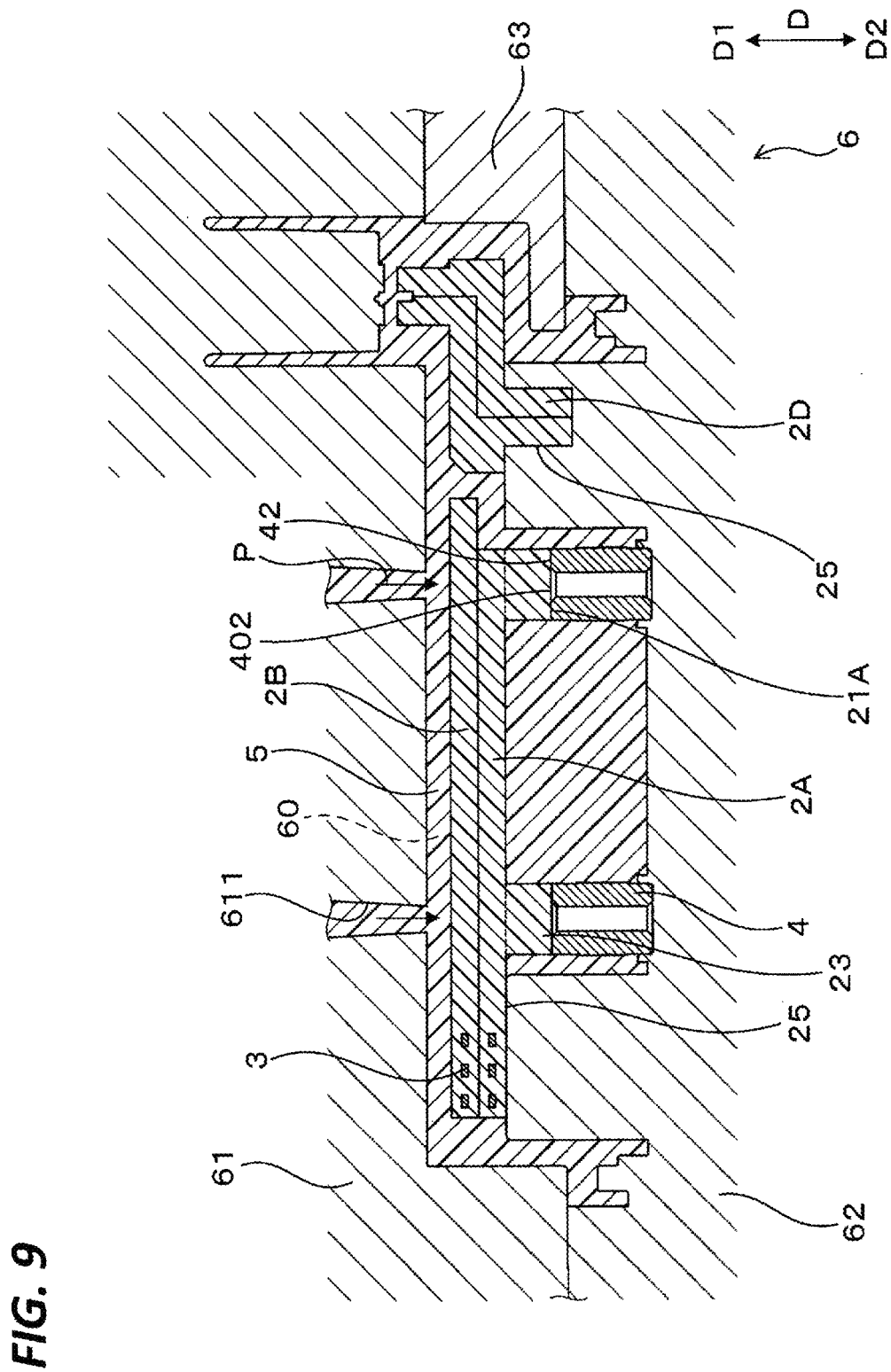
FIG. 9 is a view corresponding to the cross-section along V-V in FIG. 3 showing the state where the resin material for the outer resin portion is filled into the cavity of the mold according to the first embodiment.

As shown in FIGS. 6 and 7, in molding the outer resin portion 5, the first core resin portion 2A, the second core resin portion 2B, the power supply core resin portion 2C, the other core resin portions 2D and the through nuts 4 are arranged in the mold 6. Then, as shown in FIGS. 8 and 9, the first core resin portion 2A, the second core resin portion 2B, the power supply core resin portion 2C, the other core resin portions 2D and the through nuts 4 are arranged in the outer resin portion 5 when insert molding is performed using the resin material for the core resin portion 5.

As shown in FIGS. 6 and 7, the pair of mold parts 61, 62 are composed of a nozzle-side mold part 61 in which injection nozzles arranged on end parts of the injection cylinders of the injection molding machine are arranged and a facing-side mold part 62 for forming a cavity 60, into which the molten resin is filled, between the nozzle-side mold part 61 and the facing-side mold part 62. The nozzle-side mold part 61 is formed with gates 611 forming injection ports for the molten resin into the cavity 60.

The gates 611 of this embodiment are formed at positions of the nozzle-side mold part 61 facing a surface on the front side D1 in the mounting direction D serving as the opposite side surface 22B of the second core resin portion 2B. More specifically, the gates 611 are respectively formed at the positions of the nozzle-side mold part 61 facing the respective through nuts 4 via the first and second core resin portions 2A, 2B. Note that since the molded connector 1 cannot be taken out only by opening the pair of mold parts 61, 62, the slide mold part 63 is used to enable the take-out of the connector 1.

Further, the nozzle-side mold part 61 and the facing-side mold part 62 are formed with core holding portions 612 for holding the respective core resin portions 2A, 2B, 2C and 2D and positioning the respective core resin portions 2A, 2B, 2C and 2D with respect to the respective mold parts 61, 62. Since the respective mold parts 61, 62 are formed with the core holding portions 612, the respective core resin portions 2A, 2B, 2C and 2D are held in position in the mold 6 when the outer resin portion 5 is molded.

If the respective mold parts 61, 62 are formed with the core holding portions 612, the respective core resin portions 2A, 2B, 2C and 2D can be brought into contact with the respective mold parts 61, 62 to prevent the connector terminals 3 or the power supply terminals 3C of the respective core resin portions 2A, 2B, 2C and 2D from contacting the respective mold parts 61, 62. Further, parts of the respective core resin portions 2A, 2B, 2C and 2D held by the core holding portions 612 of the respective mold parts 61, 62 form the exposed surfaces 25 serving as parts of the respective core resin portions 2A, 2B, 2C and 2D exposed on the surface of the outer resin portion 5.

Figure 10:
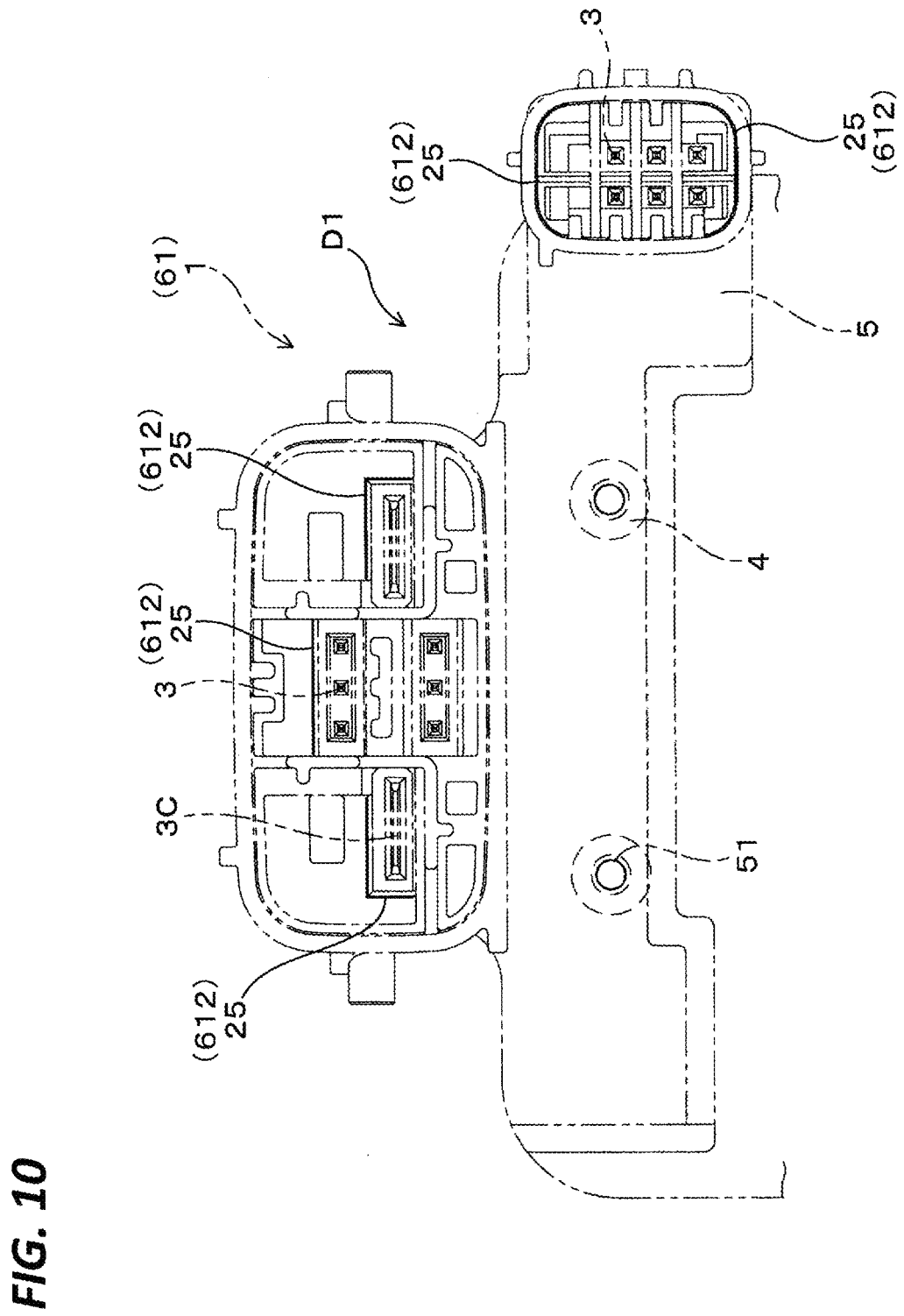
FIG. 10 is a diagram showing exposed surfaces of the respective core resin portions exposed on a surface of the outer resin portion on a front side in a mounting direction of the connector according to the first embodiment.
Figure 11:
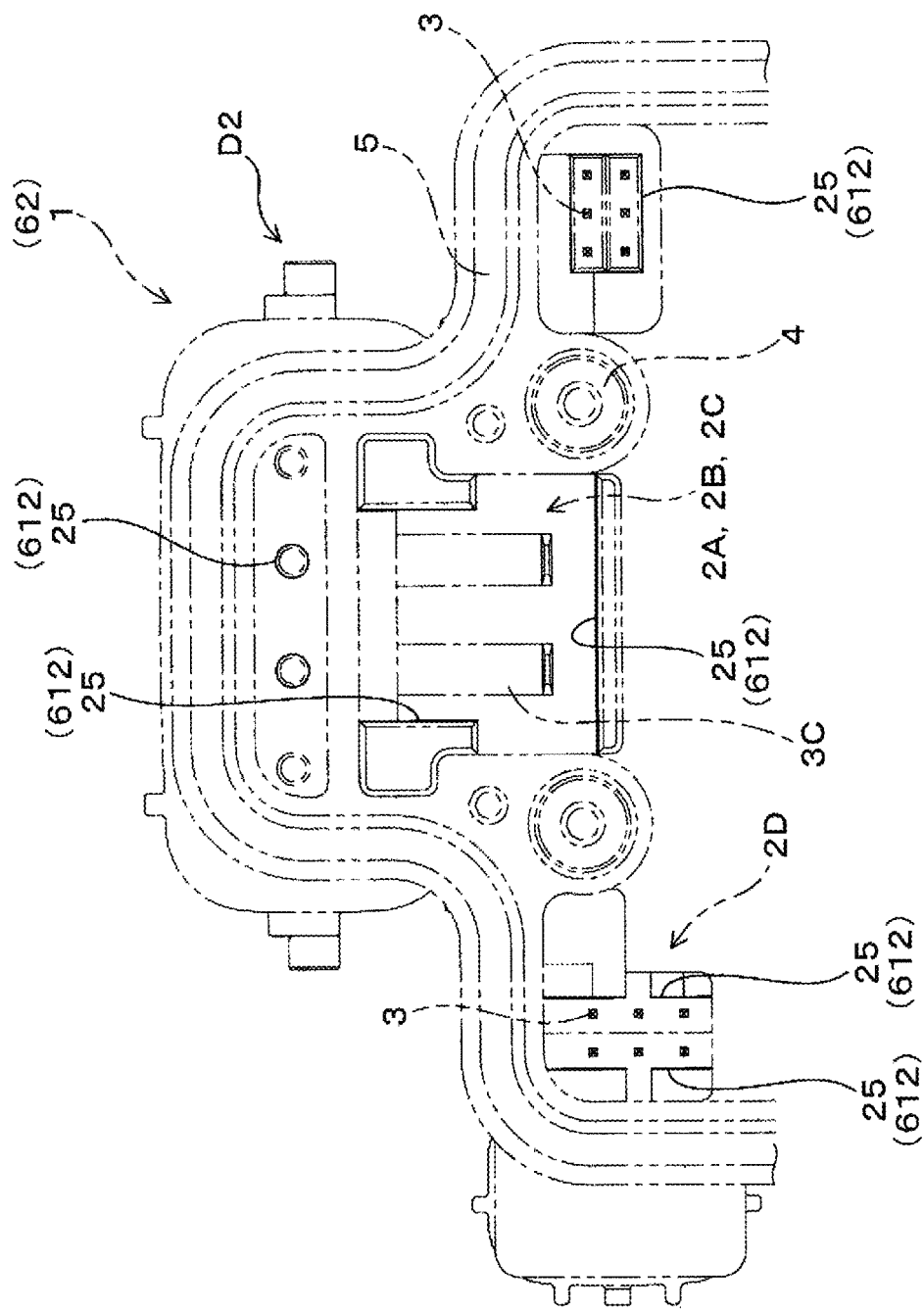
FIG. 11 is a view showing exposed surfaces of the respective core resin portions exposed on the surface of the outer resin portion on a back side in the mounting direction of the connector according to the first embodiment.

FIG. 10 shows the exposed surfaces 25 of the respective core resin portions 2A, 2B, 2C and 2D and the core holding portions 612 of the nozzle-side mold part 61 corresponding to these exposed surfaces 25 on the front side D1 in the mounting direction D1 of the connector 1. Further, FIG. 11 shows the exposed surfaces 25 of the respective core resin portions 2A, 2B, 2C and 2D and the core holding portions 612 of the facing-side mold part 62 corresponding to these exposed surfaces 25 on the back side D2 in the mounting direction D1 of the connector 1.

As shown in FIGS. 6 and 7, the facing-side mold part 62 of this embodiment is formed with nut holding portions 621 for holding the outer peripheries of the through nuts 4 near the outer end surfaces 41. The nut holding portions 621 are formed to project from a molding surface of the facing-side mold part 62 toward the cavity 60. The outer end surfaces 41 of the through nuts 4 and the parts of the outer peripheral surfaces 43 thereof adjacent to the outer end surfaces 41 are held by the nut holding portions 621, thereby being exposed on the surface of the core resin portion 5 after molding. Note that the nut holding portion 621 may be shaped to hold the screw hole 40 of the through nut 4 or may be shaped to hold the outer end surface 41 of the through nut 4 and the part of the outer peripheral surface 43 thereof adjacent to the outer end surface 41 and the screw hole 40 of the through nut 4.

(Injection Marks 51)

Figure 12:
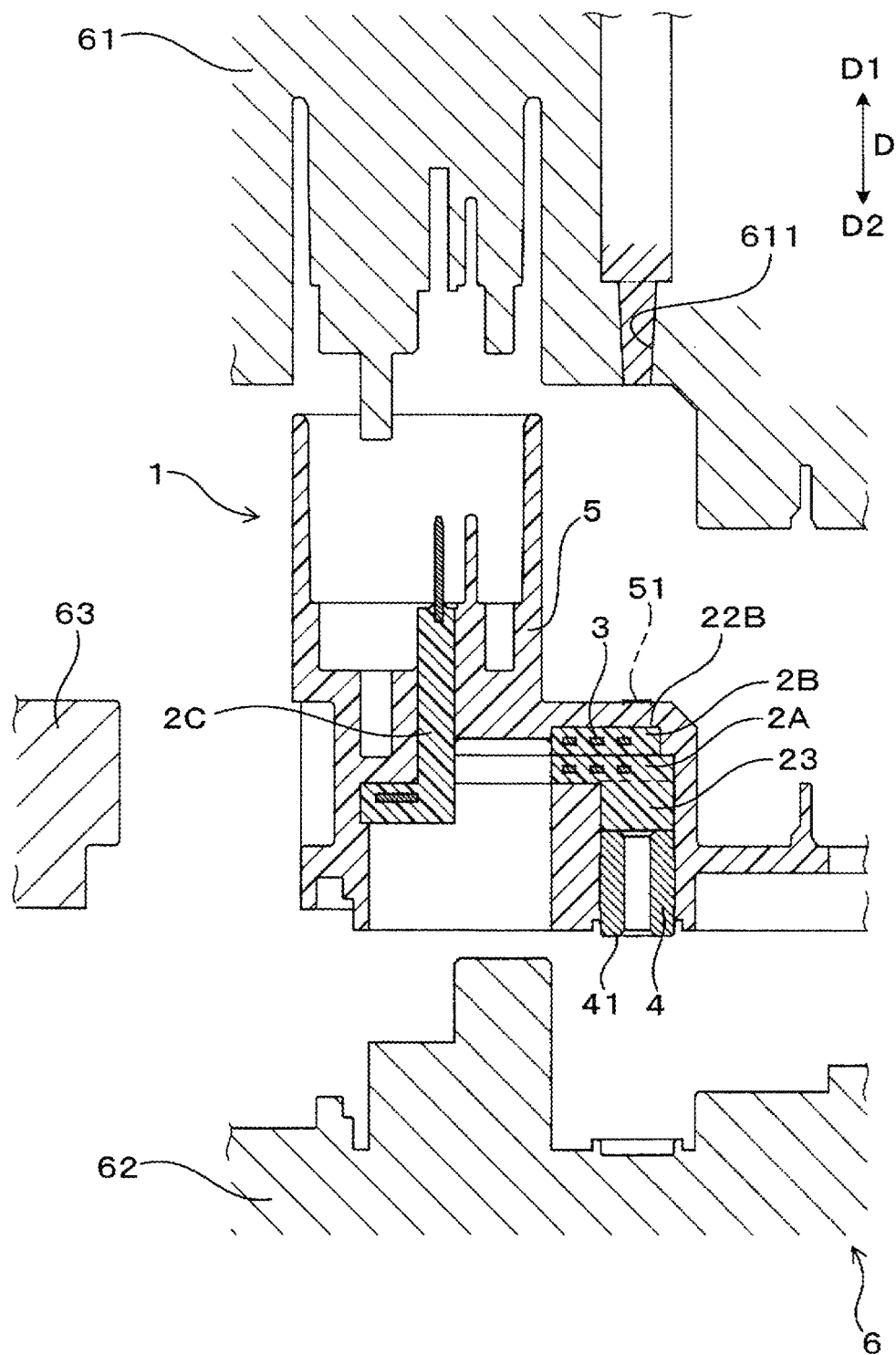
FIG. 12 is a view corresponding to the cross-section along IV-IV in FIG. 3 showing a state where the molded connector is taken out from the mold according to the first embodiment.

As shown in FIG. 12, the injection marks 51 formed on the surface of the outer resin portion 5 are formed as marks of the resin material (molten resin) arranged in the gates 611 of the nozzle-side mold part 61. Parts of the molten resin arranged and solidified in the gates 611 are cut when the connector 1 manufactured by solidifying the outer resin portion 5 is taken out from the cavity 60 formed by the respective mold parts 61, 62 and 63. After this cutting, the injection marks 51 having a circular cross-sectional shape or the like of the gates 611 remain on the surface of the outer resin portion 5. Note that the parts of the resin material in the gates 611 may be cut after the manufactured connector 1 is taken out from the cavity 60.

As shown in FIGS. 4 and 5, the injection marks 51 of this embodiment are formed on surfaces of parts of the outer resin portion 5 covering the opposite side surface 22B of the second core resin portion 2B and facing the through nuts 4 via the first and second core resin portions 2A, 2B. By the formation positions of these injection marks 51, it can be recognized that pressures P during the injection of the resin material applied to the first and second core resin portions 2A, 2B from the gates 611 were applied at positions facing the through nuts 4. In this way, it can be judged that the through nuts 4 in the connector 1 are more reliably kept in a targeted specified posture.

(Manufacturing Method)

Next, the method for manufacturing the connector 1 is described in detail.

In the method for manufacturing the connector 1 of this embodiment, the connector 1 is obtained by forming the outer resin portion 5 with the respective core resin portions 2A, 2B, 2C and 2D and the through nuts 4 as insert components using the injection molding machine and the mold 6.

In manufacturing the connector 1, as a preliminary process, the resin material is injected into a mold, in which the plurality of connector terminals 3 are arranged, to mold the first core resin portion 2A. Further, the resin material is injected into a mold, in which the plurality of connector terminals 3 are arranged, to mold the second core resin portion 2B. Further, the resin material is injected into a mold, in which the plurality of power supply terminals 3C are arranged, to mold the power supply core resin portion 2C. Further, the resin material is injected in molds, in which the plurality of connector terminals 3 are arranged, to mold the other core resin portions 2D.

Subsequently, as a molding process, the first core resin portion 2A, the second core resin portion 2B, the power supply core resin portion 2C and the other core resin portions 2D are held by the respective core holding portions 612 on molding surfaces of the respective mold parts 61, 62 as shown in FIGS. 6 and 7. Further, the respective through nuts 4 are held by the respective nut holding portions 621 on the molding surface of the facing-side mold part 62. At this time, the outer end surfaces 41 of the through nuts 4 are facing the facing-side mold part 62.

Then, the nozzle-side mold part 61 relatively approaches the facing-side mold part 62, and the nozzle-side mold part 61 and the facing-side mold part 62 are assembled to form the cavity 60 of the mold 60. At this time, in the cavity 60, the inner end surfaces 42 of the respective through nuts 4 are facing the nut facing surfaces 21A of the first core resin portion 2A.

Further, the respective gates 611 of the nozzle-side mold part 61 are facing the opposite side surface 22B of the second core resin portion 2B. More specifically, the respective gates 611 of the nozzle-side mold part 61 are facing the projection positions of the through nuts 4 on the opposite side surface 22B of the second core resin portion 2B. In other words, the inner end surfaces 42 of the respective through nuts 4 are facing the respective gates 611 of the nozzle-side mold part 61 via the first and second core resin portions 2A, 2B.

Here, the projection position of the through nut 4 can be defined as a projection range of the outer shape of the inner end surface 42 projected on the opposite side surface 22B when the outer shape of the inner end surface 42 of the through nut 4 is projected on the opposite side surface 22B of the second core resin portion 2B along the mounting direction D of the connector 1. With each gate 611 and the projection position of the through nut 4 facing each other, at least a part of a formation range of the gate 611 of the nozzle-side mold part 61 and at least a part of the projection range of the outer shape of the inner end surface 42 on the opposite side surface 22B of the second core resin portion 2B may overlap each other when viewed from the mounting direction D.

Subsequently, as shown in FIGS. 8 and 9, the molten resin material is supplied to the respective gates 611 of the nozzle-side mold part 61 from the injection cylinders and the injection nozzles of the injection molding machine. At this time, the resin material is discharged (injected) from the gates 611 toward the opposite side surface 22B of the second core resin portion 2B and collides at the projection positions of the through nuts 4 on the opposite side surface 22B of the second core resin portion 2B.

In this way, the pressures P during the injection of the resin material can be caused to act on the inner end surfaces 42 of the through nuts 4 via the second and first core resin portions 2B, 2A. Then, the through nuts 4 can be pressed against the facing-side mold part 62 via the second and first core resin portions 2B, 2A by the pressures P during the injection of the resin material. Further, when the resin material is injected toward the opposite side surface 22B of the second core resin portion 2B from the gates 611, the openings 402 of the screw holes 40 located in the inner end surfaces 42 of the through nuts 4 are closed by the nut facing surfaces 21A of the first core resin portion 2A receiving the pressures P during the injection of the resin material.

The formation of clearances between the nut facing surfaces 21A of the first core resin portion 2A and the inner end surfaces 42 of the through nuts 4 and between the facing-side mold part 62 and the outer end surfaces 41 of the through nuts 4 is prevented, utilizing the pressures P during the injection of the resin material. In this way, the penetration of the resin material into the screw holes 40 of the through nuts 4 is prevented. Further, the through nuts 4 can be prevented from moving from the nut holding portions 621 of the facing-side mold part 62. Thus, the through nuts 4 can be kept in the targeted specified posture in the nut holding portions 621 of the facing-side mold part 62.

Then, the resin material is filled into the cavity 60 of the mold 6 and the resin material in the cavity 60 is maintained at a predetermined injection pressure and solidified. As a result, the outer resin portion 5 is molded of the resin material and the connector 1 having the respective connector terminals 3, the respective power supply terminals 3C, the respective core resin portions 2A, 2B, 2C and 2D, the through nuts 4 and the like built therein is molded in the cavity 60. Thereafter, as shown in FIG. 12, the nozzle-side mold part 61 is relatively separated from the facing-side mold part 62 and the connector 1 is taken out from the cavity 60.

(Functions and Effects)

The connector 1 of this embodiment is molded, utilizing the core resin portions 2A, 2B having the plurality of connector terminals 3 arranged therein as the insert components in insert-molding the outer resin portion 5. In the molded connector 1, two through nuts 4 are arranged on the nut facing surfaces 21A of the first core resin portion 2A, and the exposed surfaces 25 of the respective core resin portions 2A, 2B and the outer end surfaces 41 of the through nuts 4 are exposed to outside. Further, the injection marks 51 at the time of molding the outer resin portion 5 are formed on the surfaces of the parts of the outer resin portion 5 covering the opposite side surface 22B of the second core resin portion 2B and facing the through nuts 4 via the first and second core resin portions 2A, 2B.

The exposed surfaces 25 of the respective core resin portions 2A, 2B exposed on the surface of the outer resin portion 5 are parts utilized to hold the respective core resin portions 2A, 2B in the respective core holding portions 612 of the respective mold parts 61, 62 in molding the outer resin portion 5 in the cavity 60. Further, the outer end surfaces 41 of the respective through nuts 4 and the parts of the outer peripheral surfaces 43 thereof adjacent to the outer end surfaces 41 are utilized to hold the through nuts 4 in the respective nut holding portions 621 of the facing-side mold part 62 in molding the outer resin portion 5 in the cavity 60. The respective through nuts 4 are so supported as not to change the postures thereof also by the first and second core resin portions 2A, 2B held in the respective core holding portions 612.

Further, the openings 402 of the screw holes 40 located in the inner end surfaces 42 of the through nuts 4 are closed by the nut facing surfaces 21A of the first core resin portion 2A. The outer resin portion 5 hardly penetrates into the screw holes 40 through the clearances between the inner end surfaces 42 and the nut facing surfaces 21A.

Further, the injection marks 51 of the outer resin portion 5 are formed by injecting the resin material for molding the outer resin portion 5 into the cavity 60 from the gates 611 provided in the nozzle-side mold part 61. In molding the outer resin portion 5 in the cavity 60, the respective core resin portions 2A, 2B and the respective through nuts 4 are held in the respective holding portions 612, 621 of the respective mold parts 61, 62. At this time, to enable the first core resin portion 2A, the second core resin portion 2B and the through nuts 4 to be arranged in the respective mold parts 61, 62, the first core resin portion 2A, the second core resin portion 2B and the through nuts 4 are not completely sandwiched by the pair of mold parts 61, 62.

That is, tiny clearances are formed between the nut facing surfaces 21A of the first core resin portion 2A and the inner end surfaces 42 of the through nuts 4 and between the first and second core resin portions 2A, 2B. The through nuts 4 held in the nut holding portions 621 may be slightly moved from the nut holding portions 621 by the resin material flowing in the cavity 60, change the postures thereof with respect to the nut holding portions 621 and be inclined with respect to the nut holding portions 621.

Accordingly, the respective through nuts 4 can be effectively pressed against the facing-side mold part 62 via the second and first core resin portions 2B, 2A by causing the resin material to collide at the projection positions of the through nuts 4 on the opposite side surface 22B of the second core resin portion 2B. In other words, the second and first core resin portions 2B, 2A can be shifted in position toward the respective through nuts 4 in the ranges of the tiny clearances, utilizing the pressures P during the injection of the resin material. In this way, in the connector 1 manufactured by molding the outer resin portion 5, the penetration of the outer resin portion 5 into the screw holes 40 of the through nuts 4 is prevented and the through nuts 4 are kept in the targeted specified posture.

Further, in molding the outer resin portion 5, the through nuts 4 are positioned by the nut holding portions 621 serving as shape changing portions formed in the facing-side mold part 62. These nut holding portions 621 need not be movable portions capable of movements such as rotational and sliding movements with respect to the facing-side mold part 62 and are formed by changing the shape of the facing-side mold part 62. In this way, the complication of the structure of the mold 6 is prevented.

Therefore, the connector 1 of this embodiment can be molded by the mold 6 having a simple structure such that the penetration of the outer resin portion 5 into the screw hole 40 of the through nuts 4 is prevented and the positions and postures of the through nuts 4 are accurately maintained. Further, according to the method for manufacturing the connector 1 of this embodiment, the connector 1 can be molded by the mold 6 having a simple structure such that the penetration of the outer resin portion 5 into the screw hole 40 of the through nuts 4 is prevented and the positions and postures of the through nuts 4 are accurately maintained.

(Other Configurations)

The respective gates 611 of the nozzle-side mold part 61 of this embodiment are caused to face the projection positions of the respective through nuts 4 on the opposite side surface 22B of the second core resin portion 2B as described above. Besides this, the respective gates 611 can be caused to face appropriate positions on the opposite side surface 22B of the second core resin portion 2B. Also in this case, the respective through nuts 4 can be pressed against the facing-side mold part 62 via the second and first core resin portions 2A, 2B by the resin material injected into the cavity 60 from the gates 611. Further, in this case, the injection marks 51 are formed at appropriate positions of the part of the outer resin portion 5 covering the opposite side surface 22B of the second core resin portion 2B.

Further, if the plurality of connector terminals 3 are arranged in one stage without being arranged in two stages, the core resin portion 2A, 2B arranged to face the through nuts 4 may not be divided into the first and second core resin portions 2A, 2B. Further, for example, if the plurality of connector terminals 3 are provided in three stages, the core resin portion may be formed by three core resin portions overlapping each other to correspond to the respective stages.

Second Embodiment

Figure 13:
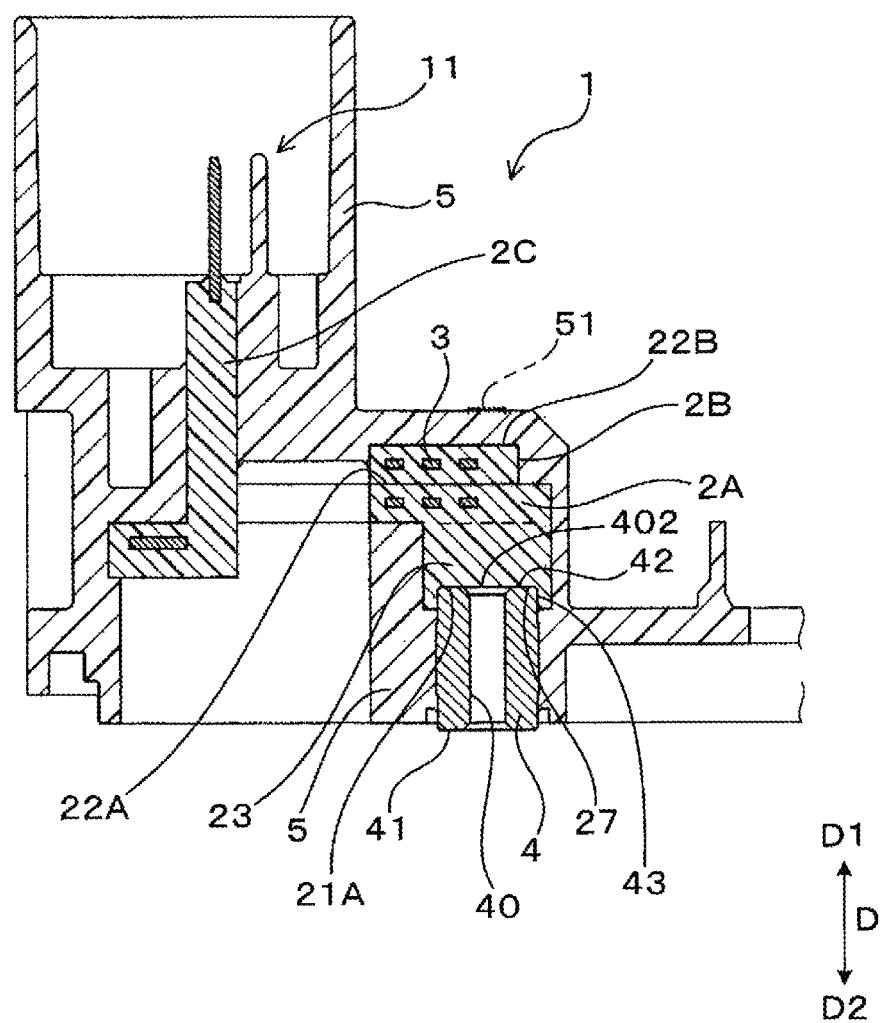
FIG. 13 is a view corresponding to the cross-section along IV-IV in FIG. 3 showing a connector according to a second embodiment.
Figure 14:
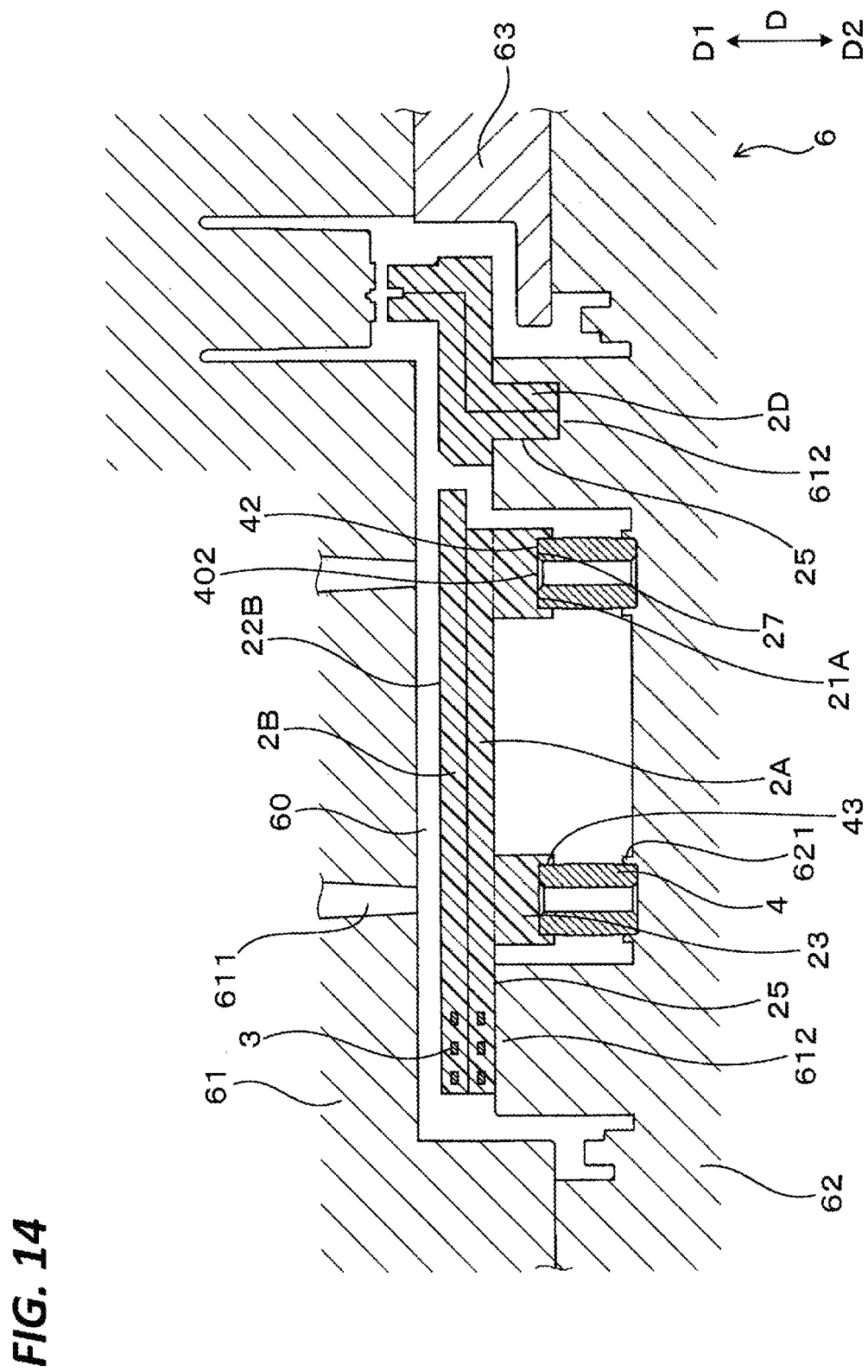
FIG. 14 is a view corresponding to the cross-section along V-V in FIG. 3 showing a state where core resin portions including connector terminals and through nuts are arranged in a mold according to the second embodiment.

In a connector 1 of this embodiment, inner end surfaces 42 of through nuts 4 and parts of outer peripheral surfaces 43 thereof adjacent to the inner end surfaces 42 are embedded in a first core resin portion 2A as shown in FIGS. 13 and 14 to more reliably maintain the through nuts 4 in a specified posture. In the connector 1 of this embodiment, the inner end surfaces 42 of through nuts 4 and the parts of the outer peripheral surfaces 43 thereof adjacent to the inner end surfaces 42 are covered by the first core resin portion 2A.

An injection molding machine and a mold 6 used in this embodiment are similar to those of the first embodiment.

As shown in FIG. 14, in a method for manufacturing the connector 1 of this embodiment, nut facing surfaces 21A are formed with recesses 27 for arranging the through nuts 4 in molding the first core resin portion 2A. This recess 27 is formed to have an outer shape (outer diameter) slightly smaller than the outer shape (outer diameter) of the part of the outer peripheral surface 43 of the through nut 4 adjacent to the inner end surface 42. Before an outer resin portion 5 is molded, the through nuts 4 can be press-fit into the recesses 27 of the first core resin portion 2A.

When a resin material for the outer resin portion 5 is filled into a cavity 60 of the mold 6 from gates 611, the through nuts 4 are less likely to move from nut holding portions 621 of a facing-side mold part 62 since the through nuts 4 are held in the recesses 27. Thus, the through nuts 4 in the nut holding portions 621 of the facing-side mold part 62 can be more reliably held in a targeted specified posture.

Further, since the inner end surfaces 42 of through nuts 4 and the parts of the outer peripheral surfaces 43 thereof adjacent to the inner end surfaces 42 are held in the recesses 27, the resin material is made less likely to penetrate into screw holes 40 from openings 402 of the screw holes 40 in the inner end surfaces 42.

Further, the outer shape of the recess 27 of the first core resin portion 2A can be formed to be slightly larger than that of the part of the outer peripheral surface 43 of the through nut 4 adjacent to the inner end surface 42. In this case, the through nuts 4 can be easily arranged in the recesses 27.

The other configurations, functions, effects and the like of the connector 1 and the method for manufacturing the connector 1 of this embodiment are similar to those of the first embodiment. Further, also in this embodiment, constituent elements denoted by the same reference signs as in the first embodiment are similar to those of the first embodiment.

The present invention is not limited only to the respective embodiments and different embodiments can be configured without departing from the gist of the present invention. Further, the present invention includes various modifications and modifications and the like within the scope of equivalents.

What is claimed is:

1. A connector, comprising:
a plurality of connector terminals;
a core resin portion for covering intermediate parts of the plurality of connector terminals excluding both end parts;
one or more through nuts each including a penetrating screw hole and having an inner end surface facing a nut facing surface of the core resin portion, an opening of the screw hole located in the inner end surface being closed by the nut facing surface; and
an outer resin portion for covering the core resin portion and the through nut with a part of the core resin portion and an outer end surface of the through nut exposed,
wherein an injection mark is formed, at the time of molding the outer resin portion, on a surface of a part of the outer resin portion covering an opposite side surface of the core resin portion located on a side opposite to the nut facing surface, and
a plating layer is formed on an entire surface of the through nut not defining the screw hole.

2. The connector of claim 1, wherein the injection mark is formed on the surface of the part of the outer resin portion covering the opposite side surface and facing the through nut via the core resin portion.

3. The connector of claim 1, wherein the inner end surface of the through nut and a part of an outer peripheral surface thereof adjacent to the inner end surface are covered by the core resin portion.

4. The connector of claim 1, wherein the outer end surface of the through nut and a part of a peripheral surface thereof adjacent to the outer end surface project from a surface of the outer resin portion.

5. The connector of claim 1, wherein a recess in which a part of an outer peripheral surface of the through nut is held is formed in the nut facing surface.

6. A method for manufacturing a connector by insert molding by arranging a core resin portion having a plurality of connector terminals arranged therein and one or more through nuts facing the core resin portion and each including a penetrating screw hole in a mold and injecting a resin material for an outer resin portion for covering the core resin portion and the through nut into the mold, comprising:
causing a nut facing surface of the core resin portion and an inner end surface of the through nut to face each other in the mold and causing the mold and an outer end surface of the through nut to face each other; and causing a gate of the mold for the resin material to face an opposite side surface of the core resin portion located on a side opposite to the nut facing surface facing the inner end surface of the through nut and closing an opening of the screw hole located in the inner end surface by the nut facing surface of the core resin portion receiving a pressure during injection of the resin material when the resin material is injected toward the opposite side surface from the gate, wherein a plating layer is formed on an entire surface of the through nut defining the screw hole.

7. The method of claim 6, wherein the gate is caused to face a projection position of the through nut on the opposite side surface, and the resin material injected from the gate is caused to collide at the projection position of the through nut on the opposite side surface.

\* \* \* \* \*